April 27, 1965  L. D. DUNN  3,180,110
SLUSH ICE BEVERAGE MAKER
Filed Sept. 28, 1961  2 Sheets-Sheet 1
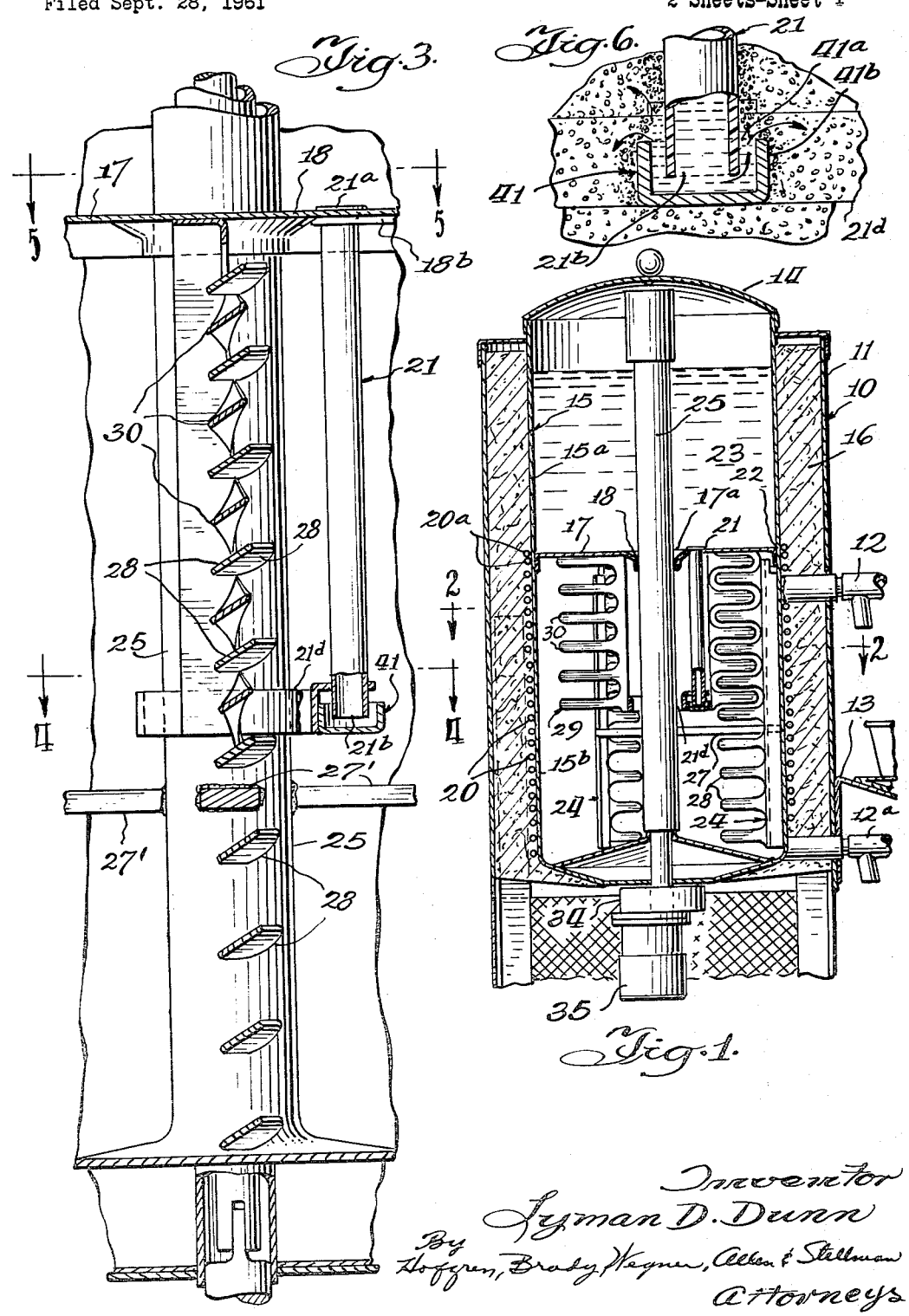

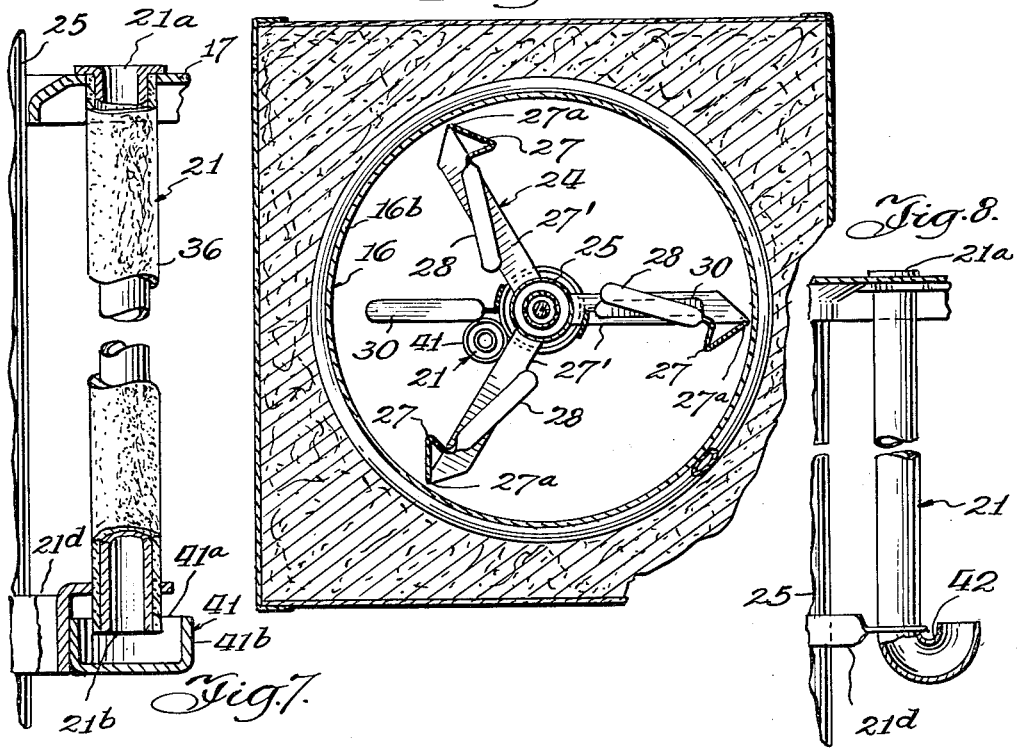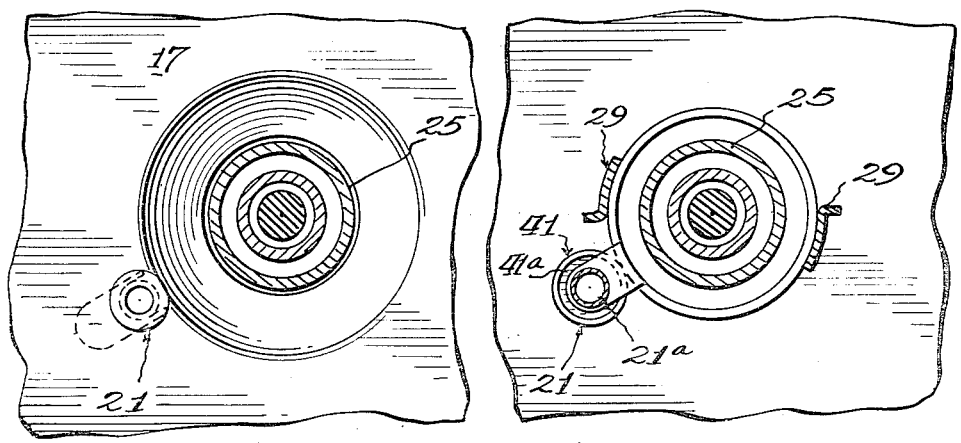

United States Patent Office 3,180,110
Patented Apr. 27, 1965

3,180,110
SLUSH ICE BEVERAGE MAKER
Lyman D. Dunn, % Marlan Co., 2555 South Parkway,
Chicago 16, Ill.
Filed Sept. 28, 1961, Ser. No. 141,407
12 Claims. (Cl. 62—343)

This invention relates to beverages and more particularly to an apparatus for making a pleasant and refreshing partially frozen non-carbonated beverage. This application is a continuation in part of my Patent No. 3,069,866, entitled "Beverage Maker."

Partially frozen beverages have become very popular in the past few years. Such beverages are generally sold at drive-in restaurants, road stands, and the like. The beverages are usually fruit flavored, non-carbonated, partially frozen drinks. In its partially frozen state the beverage contains generally about 40% ice crystals and about 60% liquid. Previous methods of preparing this beverage included freezing it in pails at about 0° Fahrenheit or preparing it in a soft serve shake freezer similar to that used in Dairy Queen stands and the like. Inherent short-comings of these methods are that the solution had to be stirred at periodic intervals and that the ice crystals formed were of irregular size, some being too thick, others too small.

In the patent issued to Caleb W. Barnum, Patent No. 3,044,277 entitled "Means for Making Fruit Flavored Slushy Drink," now owned by me, there is disclosed a machine especially designed for producing partially frozen beverages. In my co-pending application, mentioned above, there is disclosed an improved machine for producing the same type of beverage. A problem still present in these constructions, however, is the tendency of ice crystals to restrict the flow of liquid from the storage chamber to the freezing chamber. The construction of this application overcomes this problem.

It is therefore an object of this invention to provide an apparatus which obviates the problem mentioned above.

It is another object of this invention to provide an apparatus for producing a partially frozen non-carbonated fruit flavored drink which is free of internal clogging of the feed means caused by ice crystals.

It is a further object of this invention to provide an apparatus for making a partially frozen non-carbonated fruit flavored drink in which agglomeration of the ice crystals about the liquid feeding means is prevented.

It is a yet further object of this invention to provide an apparatus for making a partially frozen non-carbonated fruit flavored drink in which the ice crystals present in the beverage are not present in the liquid when the liquid is introduced to the freezing area.

Other objects and advantages of the invention will become apparent from the following description taken together with the drawings.

Of the drawings:

FIGURE 1 is a vertical sectional view showing a preferred embodiment of this invention;

FIGURE 2 is an enlarged sectional view taken along the line 2—2 of FIGURE 1;

FIGURE 3 is a fragmentary enlarged side elevational view partially in section of a portion of FIGURE 1;

FIGURE 4 is a sectional view taken along the line 4—4 of FIGURE 3;

FIGURE 5, is a sectional view taken along the line 5—5 of FIGURE 3;

FIGURE 6 is a fragmentary enlarged vertical sectional view of a portion of FIGURE 3;

FIGURE 7 is an enlarged fragmentary side elevational view partially in section of a second embodiment of the filling means; and FIGURE 8 is an enlarged fragmentary side elevational view of a third embodiment of the filling means.

Referring now to the drawings, in FIGURE 1 is shown a beverage machine 10. The machine includes a cabinet 11 generally constructed of a sheet material. The cabinet 11 is provided with a dispensing valve 12 and a drain valve 12a. Secured to the wall 11 of the machine 10 and immediately below the valve 12a is a drain support 13 which is only partially shown.

A stainless steel or like container 15 is located within the cabinet 11. A cover 14 is removably placed on the machine 10 at the top of the container 15. The container 15 is divided into a storage area 15a, and a freezing area 15b. The top 15c is open. Surrounding the container 15 within the walls of cabinet 11 is a layer of insulation 16. Separating the storage area 15a from the freezing area 15b of the container 15 is a dividing means or partition 17. This dividing means is held in place by hooks and pins (not shown) and may be removed for cleaning purposes.

Adjacent the lower portion of storage area 15a and surrounding the area 15b are a plurality of refrigeration coils 20, which are in thermal contact with the wall of the container 15 and are surrounded by the insulation 16. The refrigeration system and these refrigeration coils are of a conventional type. The coils 20 provide a sufficient cooling for the freezing area 15b, thus making the wall of the container a freezing surface for all liquid situated close thereto, and also these coils have some cooling effect on any liquid in the storage area 15a. The upper coils 20a serve an additional function of sealing the dividing means 17 to the wall of the container 15. These coils remove a great amount of heat from the container 15 around the periphery of the partition 17. This causes the liquid on the periphery of the partition next to the wall to freeze forming a liquid tight seal of ice between the partition 17 and the container 15. A shaft 25 passes through the center 17a of the partition 17. The partition is sealed to the shaft by means of a rubber grommet 18 which also provides a liquid tight seal.

A liquid feed passage or tube 21 provides a means for feeding the unfrozen beverage 23 from the storage or upper portion 15a to the freezing area 15b. The top of the tube 21 is flared and anchored in the partition 17 adjacent the shaft 25 and extends downwardly in the lower chamber. The tube is held at its lower end by a bracket 21d which is mounted on the lower end of the baffle 29. If desired, more than one tube 21 may be used to feed the beverage to the freezing area.

The preparation of the slush beverage and production of the ice particles in the beverage is discussed thoroughly in my co-pending application Serial No. 861,348 now Patent No. 3,069,866 issued December 27, 1962. However, this device also contains an agitator 24 including a hollow driven shaft 25 on which are mounted blades 26. As shown in FIGURE 2 the blades 26 include an outer scraping member 27 and connecting straps 27'. The squared edge of the outer scraping member 27 is shown at 27a. A plurality of fingers 28 extend inward from the blade 27. Suspended from the partition 17 is the stationary baffle 29. The baffle 29 mounts the baffle fingers 30 and the bracket 21d. The interaction of the agitator scraper 24 and its component parts with the stationary baffles 29 and the baffle fingers 30 produce generally uniform ice crystals.

A drive assembly 34 for rotating the agitator 24 is provided, driven by a motor 35 of conventional electric design.

Referring now to FIGURE 6 as well as FIGURE 3, it is seen that the tube 21 is open at both ends 21a and 21b. As previously mentioned, this tube establishes communication between the liquid storage area 15a and the freezing area 15b of the container 15. In previous machines of this type difficulties have been encountered in transmitting the solution from the storage area to the freezing area of the machine in that the ice crystals formed tend to clog up the communicating passages. Further difficulties arose because the ice crystals, being lighter, tended to pass upward through previous filling means into the storage chamber. Since the storage liquid is maintained at a warmer temperature the crystals would melt, thereby diluting the storage liquid. Eventually a much weaker beverage, flavor-wise, would be produced in such a machine. These problems are overcome in the present device.

To pass from the storage area 15a into the freezing area 15b, the liquid enters the tube 21 at the opening 21a. It passes to the bottom of the tube and out the opening 21b, emptying into tray 41, which is constructed as a part of the bracket 21d. The tray 41 is open at the top 41a. The bottom of the tube 21 extends into the tray 41 so that the sides 41b of the tray extend upward around the bottom of the tube 21. Thus, it is seen that the solution, in order to enter into the freezing area 15b, must pass out of the bottom of the tube 21a into the tray 41 and then flow upwards and out of the open top 41a of the tray 41 in order to enter the freezing area 15b. This construction insures that there will be no blockage of the tube 21 due to the agglomeration of ice crystals and that the ice crystals will not pass upward into the storage portion 15a. This is because the ice crystals would first have to travel down into the tray and then travel upwards in the tube. Since ice floats in liquid it will not tend to move down and thus will not pass the tray 41.

In FIGURE 7 there is shown a modified form of my invention wherein the tube 21 is provided with a layer of insulation 36. This construction also prevents freezing up of the tube due to the temperature in the freezing portion 15b.

In FIGURE 8, there is shown another modified form of my invention wherein the tube 21 is bent in a U-shape at its lower end as shown at 42. This construction makes the separate tray 41 unnecessary.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. Apparatus for producing a fruit flavored drink or the like including a plurality of discrete ice particles, comprising: a tank; partition means dividing said tank into a feed material portion and a freezing portion; means for removing heat passed through the walls of said tank in said freezing portion; blade means mounted in said freezing portion and adapted to turn in operation in said tank; means extending through the partition means adapted to turn said blade means; a beverage outlet in said tank; a substantially completely open and unimpeded feed tube extending a substantial distance into said freezing portion and located remote from said turning means and adapted to feed liquid to said freezing portion of said tank from said feed material portion; said feed tube having a convoluted portion intermediate the ends thereof for preventing said ice particles from passing in reverse direction therethrough; whereby said apparatus is adapted to freeze a portion of the feed material to a slush condition and pass resulting slush out of said outlet.

2. Apparatus for producing a fruit flavored drink or the like including a plurality of discrete ice particles, comrpising: a tank; partition means substantially centrally located in said tank and adapted to divide the same into a feed material portion and a freezing portion thereunder; refrigeration means surrounding said tank and adapted to remove heat passed through the walls of said freezing portion whereby some of the liquid material in said portion will be frozen on said walls; a plurality of scraping blades mounted for rotation in said freezing portion in scraping contact with said walls and adapted to remove said frozen material; a drive shaft connected to said blades and extending through said partition, said shaft being adapted to turn said blades; a beverage outlet located in said tank in said freezing portion; an elongated feed tube passing through said partition in a position remote from said shaft, said tube extending a substantial distance into said freezing portion and being open at both ends and being in free fluid communication with said feed material portion and said freezing portion whereby feed material may pass from one portion to the other, said tube having means for preventing the flow of frozen material from said freezing portion to said feed material portion, whereby said apparatus is adapted to freeze a portion of the feed material to a slush condition and pass resulting slush out of said outlet.

3. Apparatus for producing a fruit flavored drink or the like including a plurality of discrete ice particles, comprising: a tank; partition means substantially centrally located in said tank and adapted to divide the same into a feed material portion and a freezing portion thereunder; refrigeration means surrounding said tank and adapted to remove heat passed through the walls of said freezing portion whereby some of the liquid in said portion will be frozen on said walls; a plurality of scraping blades mounted for rotation in said freezing portion in scraping contact with said walls and adapted to remove frozen material; a drive shaft connected to said blades and extending through said partition, said shaft being adapted to turn said blades; a beverage outlet located in said tank in said freezing portion; an elongated feed tube passing through said partition in a position remote from said shaft, said tube being open at both ends and bent in a U-shape at its lower end and being in free fluid communication with said feed material portion and said freezing portion whereby feed material may pass from one portion to the other, whereby said apparatus is adapted to freeze a portion of the feed material to a slush condition and pass resulting slush out of said outlet.

4. Apparatus for producing a fruit flavored drink or the like including a plurality of discrete ice particles, comprising: a tank; partition means substantially centrally located in said tank and adapted to divide the same into a feed material portion and a freezing portion thereunder; refrigeration means surrounding said tank and adapted to remove heat passed through the walls of said freezing portion whereby some of the liquid material in said portion will be frozen on said walls; a plurality of scraping blades mounted for rotation in said freezing portion in scraping contact with said walls and adapted to remove said frozen material; a drive shaft connected to said blades and extending through said partition, said shaft being adapted to turn said blades; a beverage outlet located in said tank in said freezing portion; an elongated feed tube passing through said partition in a position remote from said shaft, said tube being open at both ends and being in free fluid communication with said feed material portion and said freezing portion whereby feed material may pass from one portion to the other; and an ice particle trap located adjacent the freezing portion end of said tube, said trap having upstanding side walls, said side walls being adapted to surround the freezing portion end of said tube and including the opening therein, with said walls extending upwardly above said opening whereby said walls are adapted to prevent said ice particles from passing in a reverse direction from said freezing portion to said feed material portion through said tube, whereby said apparatus is adapted to freeze a portion of the feed material to a slush condition and pass resulting slush out of said outlet.

5. The device of claim 4 wherein the said trap is a rectangular box-like arrangement having a bottom wall and four upstanding side walls and the freezing portion end of the tube extends downwardly into said trap to a level below the top of said side walls.

6. The device of claim 5 wherein said tube is located in a position parallel to said shaft.

7. The device of claim 2 wherein said tube is surrounded by insulation to prevent icing of the feed material therein.

8. The device of claim 4 wherein said tube is surrounded by insulation to prevent icing of the feed material therein.

9. Apparatus for producing a fruit flavored drink or the like including a plurality of discrete ice particles, comprising: a tank; partition means dividing said tank into a feed material portion and a freezing portion; means for removing heat passed through the walls of said tank and said freezing portion, blade means mounted in said freezing portion and adapted to turn in operation in said tank; means extending through said partition adapted to turn said blade means; a beverage outlet in said tank; feeding means comprising a substantially hollow elongated cylindrical body extending a substantial distance into the freezing portion to feed liquid to said freezing portion of said tank from said feed material portion, and means associated with said feeding means for preventing said ice particles from passing in reverse direction therethrough, whereby said apparatus is adapted to freeze a portion of the feed material to slush condition and pass resulting slush out of said outlet.

10. Apparatus for producing a fruit flavored drink or the like including a plurality of discrete ice particles, comprising: a tank; partition means substantially centrally located in said tank and adapted to divide the same into a feed material portion and a freezing portion thereunder; refrigeration means surrounding said tank and adapted to remove heat passed through the walls of said freezing portion whereby some of the liquid in said portion will be frozen on said walls; a plurality of scraping blades mounted for rotation in said freezing portion in scraping contact with said walls and adapted to remove frozen material; a drive shaft connected to said blades, said shaft being adapted to turn said blades; a beverage outlet located in said tank in said freezing portion; an elongated feed tube passing through said partition, said tube being open at both ends and bent in a U-shape at its lower end and being in free fluid communication with said feed material portion and said freezing portion whereby feed material may pass from one portion to the other, whereby said apparatus is adapted to freeze a portion of the feed material to a slush condition and pass resulting slush out of said outlet.

11. Apparatus for producing a fruit flavored drink or the like including a plurailty of discrete ice particles, comprising: a tank; partition means substantially centrally located in said tank and adapted to divide the same into a feed material portion and a freezing portion thereunder; refrigeration means surrounding said tank and adapted to remove heat passed through the walls of said freezing portion whereby some of the liquid material in said portion will be frozen on said walls; a plurality of scraping blades mounted for rotation in said freezing portion in scraping contact with said walls and adapted to remove said frozen material; a drive shaft connected to said blades, said shaft being adapted to turn said blades; a beverage outlet located in said tank in said freezing portion; an elongated feed tube passing through said partition, said tube being open at both ends and being in free fluid communication with said feed material portion and said freezing portion whereby feed material may pass from one portion to the other; and an ice particle trap located adjacent the freezing portion end of said tube, said trap having upstanding side walls, said side walls being adapted to surround the freezing portion end of said tube and including the opening therein, with said walls extending upwardly above said opening whereby said walls are adapted to prevent said ice particles from passing in a reverse direction from said freezing portion to said feed material portion through said tube, whereby said apparatus is adapted to freeze a portion of the feed material to a slush condition and pass resulting slush out of said outlet.

12. The device of claim 11 wherein the said trap is a rectangular box-like arrangement having a bottom wall and four upstanding side walls and the freezing portion end of the tube extends downwardly into said trap to a level below the top of said side walls.

References Cited by the Examiner
UNITED STATES PATENTS

| | | | |
|---|---|---|---|
| 2,527,894 | 10/50 | Tacchella | 62—342 |
| 3,004,398 | 10/61 | Mullins | 62—342 |
| 3,018,641 | 1/62 | Carpigiani | 62—342 |
| 3,112,622 | 12/63 | Bollefer | 62—354 X |

ROBERT A. O'LEARY, *Primary Examiner.*